US006908500B2

United States Patent
Fisher et al.

(10) Patent No.: US 6,908,500 B2
(45) Date of Patent: Jun. 21, 2005

(54) SYSTEM AND METHOD FOR CONTROLLING GAS TRANSPORT IN A FUEL CELL

(75) Inventors: Allison M. Fisher, Chandler, AZ (US); Joseph W. Bostaph, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 276 days.

(21) Appl. No.: 10/118,275

(22) Filed: Apr. 8, 2002

(65) Prior Publication Data

US 2003/0190504 A1 Oct. 9, 2003

(51) Int. Cl.[7] .......................... B01D 53/22; B01D 19/00
(52) U.S. Cl. .................... 96/6; 95/46; 429/53; 429/72
(58) Field of Search ..................... 95/45, 46, 51, 95/52; 96/4, 6, 12, 14; 429/53, 72

(56) References Cited

U.S. PATENT DOCUMENTS

| | | | | |
|---|---|---|---|---|
| 4,262,063 A | * | 4/1981 | Kudo et al. ............... | 429/41 |
| 4,390,603 A | * | 6/1983 | Kawana et al. ............ | 429/30 |
| 4,478,917 A | * | 10/1984 | Fujita et al. ............... | 429/33 |
| 4,562,123 A | | 12/1985 | Shimizu et al. | |
| 4,612,261 A | * | 9/1986 | Tsukui et al. ............. | 429/13 |
| 4,889,541 A | * | 12/1989 | Beaupre ...................... | 95/46 |
| 4,897,091 A | * | 1/1990 | Pasternak et al. ........... | 95/46 |
| 5,244,478 A | | 9/1993 | Jolly | |
| 5,272,017 A | * | 12/1993 | Swathirajan et al. ......... | 429/33 |
| 5,413,763 A | | 5/1995 | Jeffers | |
| 5,432,023 A | | 7/1995 | Yamada et al. | |
| 5,486,475 A | * | 1/1996 | Kramer et al. ............ | 435/266 |
| 5,525,237 A | | 6/1996 | Birbara et al. | |
| 5,599,638 A | | 2/1997 | Surampudi et al. | |
| 5,723,229 A | | 3/1998 | Scheifers et al. | |
| 5,980,742 A | | 11/1999 | Saitoh | |
| 6,010,614 A | * | 1/2000 | Keskar et al. ............. | 205/765 |
| 6,048,383 A | * | 4/2000 | Breault et al. ............. | 95/44 |
| 6,099,984 A | | 8/2000 | Rock | |
| 6,303,244 B1 | | 10/2001 | Surampudi et al. | |
| 6,537,352 B2 | * | 3/2003 | Edlund et al. .............. | 96/4 |
| 6,579,331 B1 | * | 6/2003 | Ho ........................... | 48/198.3 |

FOREIGN PATENT DOCUMENTS

| | | |
|---|---|---|
| DE | 10039960 C1 | 11/2001 |
| EP | 0073044 | 3/1983 |

* cited by examiner

Primary Examiner—Robert H. Spitzer (57) ABSTRACT

A system and method for controlling or otherwise effectively parameterizing the transport of dissolved, retained and/or exhausted gaseous byproducts generated in the operation of a fuel cell device comprises a gas permeable membrane (320) for substantially in-line, gravity-independent partitioning of, for example, carbon dioxide (710) in a DMFC device (700). Various features and parameters of the present invention may be suitably adapted to optimize the gas transport function for any specific fuel cell design. The present invention provides improved control of the rate of removal of gaseous byproducts from a fuel cell fuel solution in addition to improved application of fuel cell technology to power inter alia portable electronic devices.

19 Claims, 6 Drawing Sheets

SYSTEM AND METHOD FOR CONTROLLING GAS TRANSPORT IN A FUEL CELL

FIELD OF INVENTION

The present invention generally concerns fuel cell technology. More particularly, the present invention involves a system and method for partitioning gases produced in the operation of a fuel cell device.

BACKGROUND OF THE INVENTION

Fuel cells are electrochemical cells in which a free energy change resulting from a fuel oxidation is converted into electrical energy. The earliest fuel cells were first constructed by William Grove in 1829 with later development efforts resuming in the late 1930's with the work of F. T. Bacon. In early experiments, hydrogen and oxygen gas were bubbled into compartments containing water that were connected by a barrier through which an aqueous electrolyte was permitted to pass. When composite graphite/platinum electrodes were submerged into each compartment and the electrodes were conductively coupled, a complete circuit was formed and redox reactions took place in the cell: hydrogen gas was oxidized to form protons at the anode (e.g., "hydrogen electrode") and electrons were liberated to flow to the cathode (e.g., "oxygen electrode") where they subsequently combined with oxygen.

Since that time, interest in the development of viable commercial and consumer-level fuel cell technology has been renewed. In addition to various other benefits compared with existing conventional methods, fuel cells generally promise improved power production with higher energy densities. For example, a typical hydrogen-oxygen cell operating at about 250° C. and a pressure of about 50 atmospheres yields approximately 1 volt of electric potential with the generation of water and a small quantity of thermal energy as byproducts. More recently, however, modern Polymer Electrolyte Membrane Fuel Cells (PEMFC's) operating at much lower temperatures and pressures (i.e., on the order of about 80° C. and about 1.3 atmospheres) have been observed to produce nearly the same voltage potential.

An additional advantage of fuel cells is that they generally have a higher energy density and are intrinsically more efficient than methods involving indirect energy conversion. In fact, fuel cell efficiencies have been typically measured at nearly twice those of thermo-electric conversion methods (i.e., fossil fuel combustion heat exchange).

With respect to portable power supply applications, fuel cells function under different principles as compared with standard batteries. As a standard battery operates, various chemical components of the electrodes are depleted over time. In a fuel cell, however, as long as fuel and oxidant are continuously supplied, the cell's electrode material is not consumed and therefore will not run down or require recharging or replacement.

One class of fuel cells currently under development for general consumer use are hydrogen fuel cells, wherein hydrogen-rich compounds are used to fuel the redox reaction. As chemical fuel species are oxidized at the anode, electrons are liberated to flow through the external circuit. The remaining positively-charged ions (i.e., protons) then move through the electrolyte toward the cathode where they are subsequently reduced. The free electrons combine with, for example, protons and oxygen to produce water—a environmentally clean byproduct. However, as the redox reaction proceeds in a Direct Methanol Fuel Cell (DMFC), the build-up of byproduct carbon dioxide may limit the ability of the device to produce additional electrical power.

Prior art fuel cells have typically employed methods to eliminate byproduct gases that generally involve substantially direct gravity-dependent venting to the atmosphere or retention within the fuel cell itself. While these approaches may be acceptable in certain large-scale systems, the broader application of fuel cell technology, for example to portable consumer-level devices, presents previously unresolved problems with respect to the processing of byproduct gases. Accordingly, a limitation of prior art fuel cell technology concerns the effective and efficient partitioning of gases produced during the operation of a fuel cell device.

SUMMARY OF THE INVENTION

In various representative aspects, the present invention provides inter alia a system and method for controlling, or otherwise effectively parameterizing, the transport function of dissolved, retained and/or vented gaseous products generated in the operation of a fuel cell device. In one exemplary aspect, the present invention provides a device comprising a gas-permeable barrier in effective contact with a fluid flow field and may be sealed to prevent, for example, leakage or migration of fluid and/or gases contained therein beyond the barrier other than via substantially permeative transport through the barrier. Additionally, methods of constructing and using such devices are provided to better control the rate of gas transport by variation of, for example: the operating temperature; the flow field surface area; the composition and/or porosity of the barrier; the orientation and/or geometric configuration of the permeable barrier; the volume of the fluid stream in the flow field; the back-side partial gas pressure; the fuel stream hydraulic pressure; the fluid stream flow rate through the flow field; the thickness of the permeable barrier; and the like.

A representative advantage of the present invention includes the user- or designer-controlled processing and/or partitioning of gases produced during operation of a fuel cell device. Another exemplary advantage includes the ability to operate a fuel cell in generally any orientation to vent gaseous byproducts while substantially retaining the fluid solution without significant leakage or fluid migration therefrom.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described and claimed—reference being had to the accompanying drawings forming a part hereof, wherein like numerals refer to like parts throughout. Other elements, operational features, applications and/or advantages will become apparent to skilled artisans in light of certain exemplary embodiments recited in the detailed description, wherein:

Those skilled in the art will appreciate that elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following descriptions are of exemplary embodiments of the invention and the inventors' conception of the best mode and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for controlling or otherwise parameterizing the transport and/or distribution of gases in a fuel cell system. Certain representative implementations may include, for example: controlling the concentration of dissolved gases in a fuel cell solution; controlling the concentration of gaseous phase chemical species in a fuel cell; or controlling the rate of effusion of exhaust gases from a fuel cell. As used herein, the terms "exhaust", "vent", "transport", "diffuse", "effuse" and "partition", or any variation or combination thereof, are generally intended to include anything that may be regarded as at least being susceptible to characterization as or generally referring to the movement of at least one chemical compound from one area to another area so as to: (1) relatively decrease the concentration in or around one area, and/or (2) relatively increase the concentration in or around another area. The same shall properly be regarded as within the scope and ambit of the present invention. As used herein, the terms "fuel", "fluid", "solution", "stream", "liquid" and "effluent", or any variation or combination thereof, are generally intended to include any anode fuel solution and/or cathode oxidant solution whether or not the solution has been pre-conditioned or post-conditioned with respect to exposure to a fuel cell's electrode elements.

A detailed description of an exemplary application, namely the parameterization and control of the rate of elimination of carbon dioxide from a DMFC anode fuel stream, is provided as a specific enabling disclosure that may be generalized by skilled artisans to any application of the disclosed system and method for controlling gas transport in any type of fuel cell in accordance with various embodiments of the present invention. Moreover, skilled artisans will appreciate that the principles of the present invention may be employed to ascertain and/or realize any number of other benefits associated with controlling the transport of gases in a fuel cell such as, but not limited to: reclamation of gaseous byproducts; reformation of at least one constituent fuel compound; controlling the concentration of dissolved gaseous byproducts in a fuel system; controlling a fuel cell's redox reaction kinetics and the like.

Fuel Cells

In the broadest sense, a fuel cell may be generally characterized as any device capable of converting the chemical energy of a supplied fuel directly into electrical energy by electrochemical reactions. This energy conversion corresponds to a free energy change resulting from the oxidation of a supplied fuel. As depicted, for example, in FIG. 1, a typical prior art fuel cell 110 consists of an anode (e.g., 'fuel electrode') 130 that provides a reaction site to generate electrons and a cathode (e.g., 'oxidant electrode') 135 to reduce spent fuel ions in order to produce a voltage drop across the external circuit 150. The electrodes 130, 135 are generally tonically porous electronic conductors that include catalytic properties to provide significant redox reaction rates. At the anode 130, incident hydrogen gas 160 catalytically ionizes to produce protons (e.g., electron-deficient hydrogen nuclei) and electrons. At the cathode 135, incident oxygen gas 165 catalytically reacts with protons migrating through the electrolyte 140 and incoming electrons from the external circuit 150 to produce water as a byproduct. Depending on various operational parameters of the fuel cell 110, byproduct water may remain in the electrolyte 140, thereby increasing the volume and diluting the electrolyte 140, or may be discharged from the cathode 135 as vapor.

Figure 1:
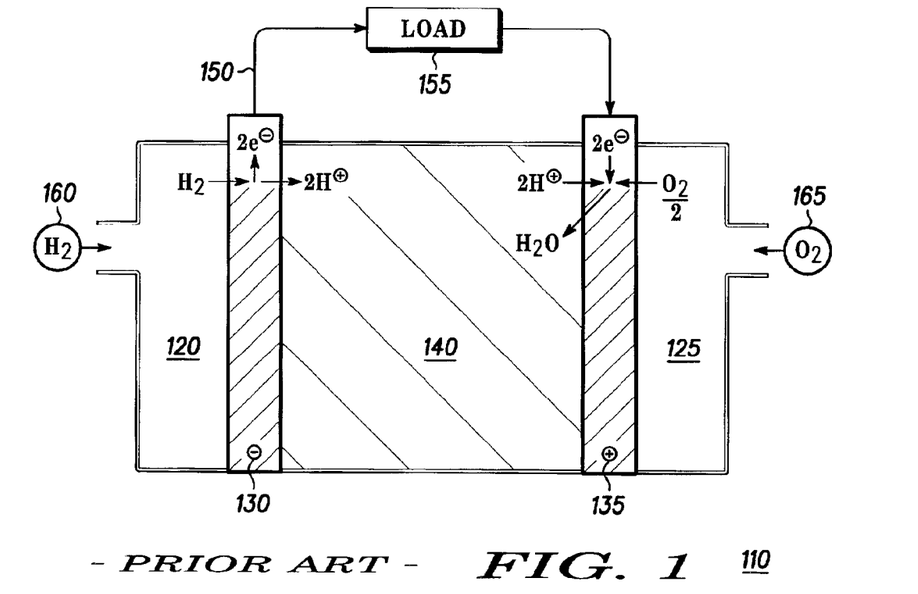
FIG. 1 illustrates a schematic of a typical hydrogen-oxygen fuel cell as practiced in the prior art.

The anode 130 and cathode 135 are generally separated by an ion-conducting electrolytic medium 140 (i.e., PEM's or alkali metal hydroxides such as, for example: KOH, NaOH and the like). In early fuel cell experiments, hydrogen 160 and oxygen 165 were introduced into compartments 120 and 125 respectively while the electrodes 130, 135 where conductively coupled by an external circuit 150 to power a load 155 where electrical work could be accomplished. In the external circuit 150, electric current is generally transported by the flow of electrons, whereas in the electrolyte 140, current is generally transported by the flow of ions. In theory, any chemical substance capable of oxidation (i.e., hydrogen, methanol, ammonia, hydrazine, simple hydrocarbons, and the like) which may be supplied substantially continuously may be used as galvanically oxidizable fuel 160 at the anode. Similarly, the oxidant 165 (i.e., oxygen, ambient air, etc.) may be selected to be any substance that can oxidize spent fuel ions at a sufficient rate to maintain a suitable voltage drop across the external circuit 150.

Thermodynamics

The free energy of reaction $\Delta G$ of a fuel cell is given as $\Delta G=\Delta E+\Delta H$, where $\Delta E$ is the energy available to accomplish electrical work and $\Delta H$ is the energy liberated from the reaction to raise the temperature of the fuel cell and the surroundings. In typical fuel cell applications, the heat liberated to the fuel cell's surroundings is much less than the energy available to accomplish electrical work; which may be expressed as: $\Delta H<<\Delta E$.

For example, where $$Q_{FuelCell} = \frac{E_{Electrical}}{E_{Chemical}}$$

represents the efficiency of converting chemical potential energy $E_{Chemical}$ directly to electrical energy $E_{Electrical}$, typical hydrogen/oxygen fuel cell efficiencies on the order of $Q_{FuelCell}=0.65$ to about $Q_{FuelCell}=0.80$ have been observed. These values are nearly twice those of indirect heat-exchange power conversion methods, which may be expressed by the following relation:

$$Q_{FuelCell}=2Q_{HeatExchange}$$

where the heat-exchange efficiency is given as $$Q_{HeatExchange} = \frac{E_{Combustion}}{E_{Chemical}} \times \frac{E_{Electrical}}{E_{Combustion}}$$

The factor $$\frac{E_{Combustion}}{E_{Chemical}}$$

represents the component efficiency of converting chemical potential energy into heat (i.e., the combustion of fossil fuels) and the factor $$\frac{E_{Electrical}}{E_{Combustion}}$$

represents the component efficiency of converting heat into electrical energy; for example, steam-driven turbo-electric power.

Accordingly, fuel cell operation is intrinsically more efficient than methods employing heat-exchange power conversion. Moreover, other representative benefits of fuel cells include higher energy densities, quiet operation and the lack of recharging and/or electrode replacement requirements.

Portable Power Supplies

Standard batteries have generally dominated the available choices for portable power storage solutions for consumer-level electronic equipment in the past. Some of the disadvantages associated with standard batteries, however, is that they generally provide power for a relatively short duration of time and thereafter require recharging or replacement. Fuel cells, on the other hand, have many of the consumer-oriented features typically associated with standard batteries (i.e., providing quiet power in a convenient and portable package) in addition to other representative advantages including, for example, long usage lifetimes and the ability to be fueled with liquid or gaseous compounds rather than 'solid fuels' as used in conventional batteries.

While the size of fuel cells has decreased and their energy densities have increased over time, there have been various problems in the prior art with adaptation of fuel cell technology to applications for delivering power, for example, to portable electronic devices. At least one such problem involves the processing and/or venting of exhaust gases in a fuel cell solution stream. Typical approaches that have been employed have generally involved substantially direct, orientation-dependent (e.g., anti-parallel to gravity) venting of redox byproduct gas to the ambient atmosphere; however, direct venting, gravity-dependent approaches generally do not permit the fuel cell to be operated in any orientation without substantial leakage or otherwise undesirable migration or leakage of fuel components.

Fuel Cell Development

One class of fuel cells currently under development for consumer use is the hydrogen fuel cell, wherein hydrogen-rich fuels (i.e., hydrogen, methanol, methane, etc.) are used to fuel the redox reaction. As fuel is oxidized at the anode, protons pass through the cell for reduction at the cathode. In the case of using methanol as the fuel for example, carbon dioxide is formed as a byproduct at the anode. Free electrons from the external circuit then affect reduction of oxygen at the cathode. The reduced oxygen then combines with protons to produce water.

One process for fueling a hydrogen cell comprises that of 'direct oxidation' methods. Direct oxidation fuel cells generally include fuel cells in which an organic fuel is fed to the anode for oxidation without significant pre-conditioning or modification of the fuel. This is generally not the case with 'indirect oxidation' (e.g., "reformer") fuel cells, wherein the organic fuel is generally catalytically reformed or processed into organic-free hydrogen for subsequent oxidation. Since direct oxidation fuel cells do not generally require fuel processing, direct oxidation provides substantial size and weight advantages over indirect oxidation methods. Exemplary prior art direct and indirect fuel cells have been previously disclosed and may be compared, for example, in U.S. Pat. Nos. 3,013,908; 3,113,049; 4,262,063; 4,407,905; 4,390,603; 4,612,261; 4,478,917; 4,537,840; 4,562,123; 4,629,664 and 5,599,638.

Another well-known type of fuel cell component is known as a 'membrane-electrode assembly' (MEA), as described for example in U.S. Pat. No. 5,272,017 issuing on Dec. 21, 1993 to Swathirajan. One exemplary embodiment of such an MEA component includes a DMFC as generally depicted, for example, in FIG. 2. The illustrated DMFC MEA comprises a thin, proton-transmissive, solid polymer-membrane electrolyte 240 having an anode 230 on one of its faces and a cathode 235 on an opposing face. The DMFC MEA anode 230, electrolyte 240 and cathode 235 may also be sandwiched between a pair of electrically conductive elements 290, 295 which serve as current collectors for the anode 230 and cathode 235 respectively and contain appropriate channels and/or openings for generally distributing the fuel 262 (i.e., methanol and water, in the case of a DMFC device) and oxidant reactants 265 (i.e., oxygen) over the surfaces of the corresponding electrode catalyst. In practice, a number of these unit fuel cells may be stacked or grouped together to form a 'fuel cell stack'. The individual cells may be electrically connected in series by abutting the anode current collector 290 of one cell with the cathode current collector 295 of a neighboring unit cell in the stack.

Figure 2:
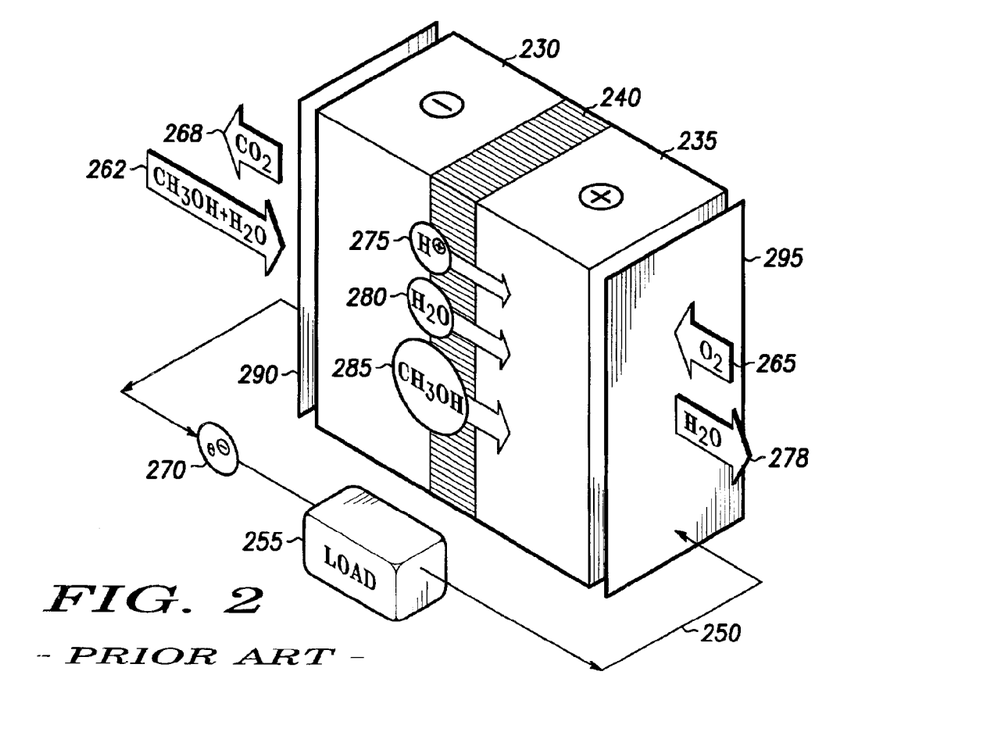
FIG. 2 illustrates a typical DMFC device as practiced in the prior art.

As the DMFC anode 230 is fueled with a mixture 262 of methanol 285 and water 280, the oxidation reaction generally proceeds in three steps: (1) methanol oxidizes to methanal (e.g., formaldehyde), releasing two electrons; (2) methanal oxidizes to methanoic acid (e.g., formic acid), releasing two electrons; and (3) methanoic acid oxidizes to carbon dioxide, releasing another two electrons. In various embodiments of exemplary DMFC's, the oxidation reaction may be started at any point in the multi-step series since the two intermediates (methanal and methanoic acid) are generally readily obtainable. It is generally believed, however, that the first oxidative step (methanol to methanal) is the rate-determining step of the overall reaction given spectroscopic studies indicating that methanal and methanoic acid appear in relatively low concentrations. This would generally suggest that the intermediates are rapidly oxidized and accordingly, the reaction steps corresponding to their oxidative consumption would be expected to have larger kinetic rate constants. The net anode reaction for a direct methanol-fueled device is therefore generally given as:

$$CH_3OH + H_2O \rightarrow 6H^+ + 6e^- + CO_2$$

Typically, the current produced by a DMFC is proportional to the net reaction rate, wherein one ampere corresponds approximately to 1.04E18 reactions per second. As aqueous methanol 285 is oxidized at the anode 230, electrons 270 are liberated to flow through an external circuit 250 to power a load 255 where electrical work may be accomplished. Protons 275 migrate through the proton-transmissive electrolytic membrane 240 where they subsequently are combined with oxygen 265 that has been reduced with incoming electrons 270 from the external circuit 250 with water 278 formed as a result.

Prior art DMFC's have generally employed methods of exhausting water 278 at the cathode 235 and carbon dioxide 268 at the anode 230 that generally involve substantially direct gravity-dependent venting to the atmosphere or retention within the fuel cell itself. Accordingly, one representative advantage of various embodiments of the present invention includes the ability to effectively vent and/or control the concentration of byproduct gases in a redox fuel system in substantially any orientation of the device with respect to gravity. In one representative and enabling aspect, the present invention may be practiced, for example, to control the elimination of $CO_2$ from the anode fuel stream in a DMFC device; however, the present invention may be alternatively practiced, extended or otherwise modified to partition or otherwise separate any byproduct gas in the anode fuel solution, the cathode oxidant solution and/or any other pre- or post-conditioned solution (i.e., a waste solution) in a fuel cell device.

Controlling Gas Transport

Given a thin barrier of infinite permeability and cross-sectional area A that extends from x to x+l (where l represents the thickness of the barrier), the volume of the barrier may be expressed as V=Al. Let the concentration at point x of gas G be [G] at time t. Accordingly, the number of gas particles that enter the barrier per unit time is JA where J is the particle flux. Therefore, the rate of increase in molar concentration inside the barrier due to the incoming particle flux is $$\left.\frac{\partial [G]}{\partial t}\right|_x = \frac{JA}{Al} = \frac{J}{l}.$$

Consider also an out-bound flux of gas particles at the x+l surface of the barrier which may be similarly derived as $$\left.\frac{\partial [G]}{\partial t}\right|_{x+l} = \frac{J'A}{Al} = \frac{J'}{l}.$$

Therefore, the net time rated change of concentration (e.g., the 'concentration velocity') may be expressed as:

$$\frac{d[G]}{dt} = \frac{J - J'}{l}$$

Suppose: (1) that the flux of particles J diffusing inside the barrier comprises motion in response to a thermodynamic force $\mathscr{F}$ arising from a concentration gradient; (2) that the particles reach a steady-state drift speed s when the thermodynamic force $\mathscr{F}$ is matched by the viscous drag; (3) that the drift speed s is proportional to the thermodynamic force $\mathscr{F}$; (4) that the particle flux J is proportional to the drift speed; and (5) that the thermodynamic force $\mathscr{F}$ is proportional to the spatial concentration gradient

$$\frac{d[G]}{dx}.$$

The resulting chain of proportionalities $J \propto s$, $s \propto \mathscr{F}$, and $$\mathscr{F} \propto \frac{d[G]}{dx}$$

implies that the particle flux J is proportional to the concentration gradient $$\frac{d[G]}{dx},$$

which will be apparent to skilled artisans as corresponding to 'Fick's First Law of Diffusion'. The constant of proportionality is given as the diffusion coefficient z,901 in the equation $$J = \mathcal{D}\frac{d[G]}{dx}$$

for diffusion restricted to a single dimension x. Therefore, the expression J–J' taken from the expression for the diffusive concentration velocity becomes $$\mathcal{D}\frac{d[G]'}{dx} - \mathcal{D}\frac{d[G]}{dx}.$$

Substitution of the linear accumulation of particle concentration over the thickness of the membrane yields $$J - J' = \mathcal{D}\frac{d}{dx}\left([G] + \frac{d[G]}{dx}l\right) - \mathcal{D}\frac{d[G]}{dx}$$

which further reduces to $$J - J' = \mathcal{D}l\frac{d^2[G]}{dx^2}.$$

This expression may then be substituted back into the concentration velocity expression to give:

$$\frac{d[G]}{dt} = \frac{J - J'}{l} = \mathcal{D}\frac{d^2[G]}{dx^2} = \mathcal{D}\nabla_x^2[G]$$

which will be apparent to skilled artisans as the time dependent diffusion equation according to 'Fick's Second Law of Diffusion' and relates the concentration velocity at any point to the spatial variation of the concentration at that point. More generally, this may be appreciated as a physical basis for the typically observed behavior of diffusing chemical species translating away from areas of relative high concentration to areas of relative lower concentration (e.g., "moving down the concentration gradient").

Next, consider the time dependence of the partial molecular pressure p of an effusing gas G from a container of given volume V. The 'Ideal Gas Law' PV=nRT, which for molecular-scale systems rather than for large aggregates of particles (i.e., moles of molecules), becomes pV=nkT wherein:

p is the partial molecular pressure;
V is the volume of the container providing spatial boundary conditions;
n is the number of particles;
k is the Boltzmann constant; and
T is the temperature.

Solving for the partial pressure yields $$p = \frac{nkT}{V}.$$

After taking the partial derivative with respect to time at constant temperature and volume, the following expression for the pressure velocity may be obtained:

$$\left.\frac{\partial p}{\partial t}\right)_{T,V} = \frac{\partial\left(\frac{nkT}{V}\right)}{\partial t} = \frac{kT}{V}\frac{\partial n}{\partial t}$$

For an effusing gas that is not replenished over time as the gas escapes, the time-rated change of the number of particles is given as $$\frac{\partial n}{\partial t} = -Z_w A_o,$$

where $Z_w$ is the collisional frequency associated with the mean free path of the gas particles and $A_o$ is the area of the opening that the effused gas has available to escape from. The collisional frequency is related to the partial pressure of the gas p, the mass of the gas m and the temperature of the system T by the equation $$Z_w = \frac{p}{\sqrt{2\pi mkT}}.$$

Substitution of this relation back into the expression for the pressure velocity yields $$\frac{\partial p}{\partial t} = \frac{-pA_0}{V}\sqrt{\frac{kT}{2\pi m}}$$

which integrates over time to $p=p_0 e^{-1/\tau}$, where $$\tau = \frac{V}{A_0}\sqrt{\frac{2\pi m}{kt}}.$$

From this expression for the effusive pressure velocity, the following may generally be observed: (1) if the gas is not replenished, the pressure decreases exponentially to zero; (2) the pressure velocity is faster with increasing temperature and slower with decreasing temperature; (3) the pressure velocity is slower with heavier particles and faster with less massive particles; (4) the pressure velocity is faster with increasing surface area of the effusive opening(s) and slower with decreased surface area; and (5) the pressure velocity is slower with increasing volume of the effusive container and faster with increasing volume.

At constant temperature, the time derivative of the expression for the partial pressure $$p = \frac{nkT}{V}$$

becomes:

$$\left.\frac{\partial p}{\partial t}\right)_T = kT\frac{\partial\left(\frac{n}{V}\right)}{\partial t} = kT\frac{\partial[G]}{\partial t}$$

Therefore, substituting the expression corresponding to Fick's Second Law of Diffusion for the concentration velocity previously derived, the generalized expression for the pressure velocity of a gas diffusing in three dimensions in a barrier of infinite permeability as a function of concentration of the gas [G] may be represented as:

$$\left.\frac{dp}{dt}\right)_T = kT\mathcal{D}_G\nabla^2[G] = -kT\mathcal{D}_G\left(\frac{\partial^2}{\partial x^2} + \frac{\partial^2}{\partial y^2} + \frac{\partial^2}{\partial z^2}\right)[G]$$

If, however, the barrier is assumed to have finite diffusive permeability, an additional diffusion coefficient $\hat{D}_{\Psi(a,b,c\ldots)}$ may be included to account for various barrier-dependent permeability metrics such as, for example: non-uniform porosity; anisotropic transport along different dimensions; hydrophobicity; barrier/membrane/capillary defects; etc.

As enabling disclosure for a representative embodiment directed to an exemplary DMFC system in accordance with one aspect of the present invention is developed, it will be convenient to consider the expression for carbon dioxide diffusing through a membrane (or otherwise porous barrier) $\Psi$:

$$\left.\frac{dp}{dt}\right)^{diffusion}_{\Psi, CO_2} = -kT(\hat{D}_{\Psi(a,b,c)} \mathcal{D}_{CO_2})\left(\frac{\partial^2}{\partial x^2} + \frac{\partial^2}{\partial y^2} + \frac{\partial^2}{\partial z^2}\right)[CO_2]$$

Upon inspection, this expression relates the concentration of carbon dioxide at any point within a membrane (or otherwise porous barrier) $\Psi$ to the three dimensional variation of carbon dioxide concentration at that point; which is to say that carbon dioxide will diffuse through a porous barrier so as to move down its concentration gradient from volume elements comprising higher $CO_2$ concentration to volume elements comprising relative lower $CO_2$ concentration.

Substitution of $A_\Psi l$ for the volume V in the effusion equation.

$$\frac{dp}{dt} = \frac{-pA_0}{V}\sqrt{\frac{kT}{2\pi m}} \quad \text{yields} \quad \frac{dp}{dt} = \frac{-pA_0}{A_\Psi \ell}\sqrt{\frac{kT}{2\pi m}}.$$

If the ratio of the area of the membrane openings to the aggregate surface area of the membrane normal to the effusing particle transport path is taken to be a dimensionless quantity $\theta$ corresponding to the porosity of the membrane at the surface of effusion, a composite expression for carbon dioxide effusing from a membrane (or otherwise porous barrier) surface becomes:

$$\left.\frac{dp}{dt}\right)^{effusion}_{\Psi, CO_2} = -p_{CO_2}\theta_\Psi \sqrt{\frac{kT}{2\pi m_{CO_2}\ell^2_\Psi}}$$

and relates the vapor pressure of carbon dioxide that diffuses through the barrier to reach the exterior surface of the porous barrier $\Psi$ to: the back-side pressure of carbon dioxide $p_{CO_2}$; the temperature T; the mass of carbon dioxide $m_{CO_2}$; the thickness of the barrier l; and the porosity of the barrier $\theta_\Psi$. Accordingly, carbon dioxide will generally: (1) effuse more rapidly at higher operating temperatures and more slowly at lower temperatures; (2) effuse more rapidly with increased back-side pressure of $CO_2$ and more slowly with decreased back-side pressure; (3) effuse more rapidly with membranes having increased porosity and more slowly with decreased porosity; and (4) effuse more rapidly with porous barriers having decreased linear transport distances (e.g., thinner membranes) and more slowly with increased transport distances.

In a fuel cell where such byproduct gas is not effectively processed, the build-up of pressure may damage the fuel cell preventing it from operating for its intended purpose, or may otherwise kinetically impede progress of the redox reaction to produce further electric power.

Controlling $CO_2$ Transport in a DMFC

Figure 3:
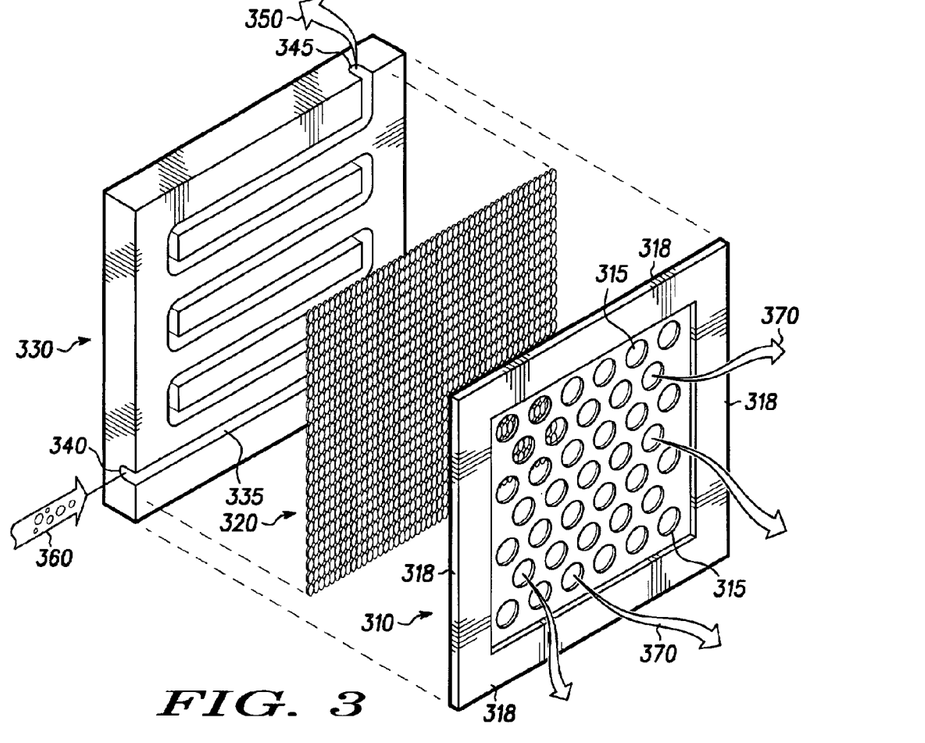
FIG. 3 illustrates an exploded perspective view of a component system for at least partially partitioning a gas in accordance with one exemplary embodiment of the present invention.

In an exemplary embodiment in accordance with one representative aspect of the present invention, as depicted for example in FIG. 3, a system for controlling the partitioning of gaseous byproducts in a fuel cell comprises at least two components: a fluid flow field 330 and a gas-permeable barrier 320. Fuel fluid 360 having at least one gaseous component therein may be introduced to fluid flow field 330 at flow field inlet 340 to flow through flow field channels 335. As fluid 360 comes into contact with a first surface of gas-permeable barrier 320, at least one gaseous component carried in fuel stream 360 diffuses through said first surface of barrier 320 to exit through a second opposing surface of said barrier 320. The concentration of said gaseous component in fuel fluid 360 is thereby at least partially reduced so that effluent fluid 350 drawn off from flow field 330 at flow field outlet 345 has at least a lower relative concentration of said gaseous component than incident fluid 360 at said flow field inlet 340.

Figure 4:
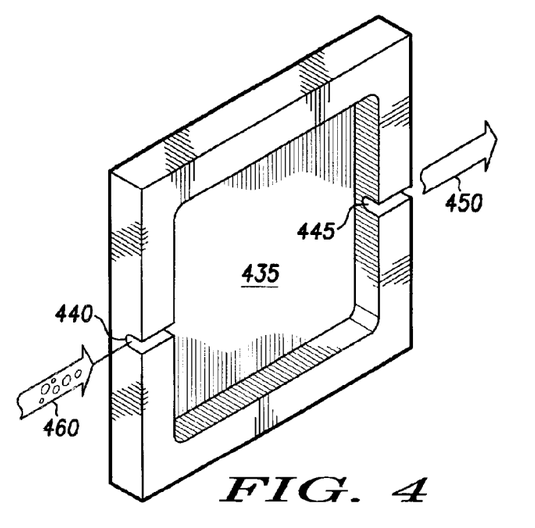
FIG. 4 illustrates a perspective view of a component device for at least partially partitioning a gas in accordance with another exemplary embodiment of the present invention.
Figure 5:
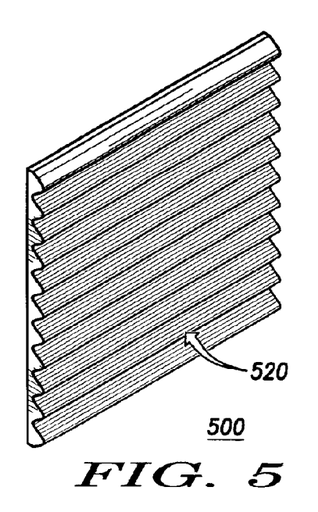
FIG. 5 illustrates a perspective view of a component fluid flow field in accordance with another exemplary embodiment of the present invention.
Figures 6, 7, 8, 9, 10:
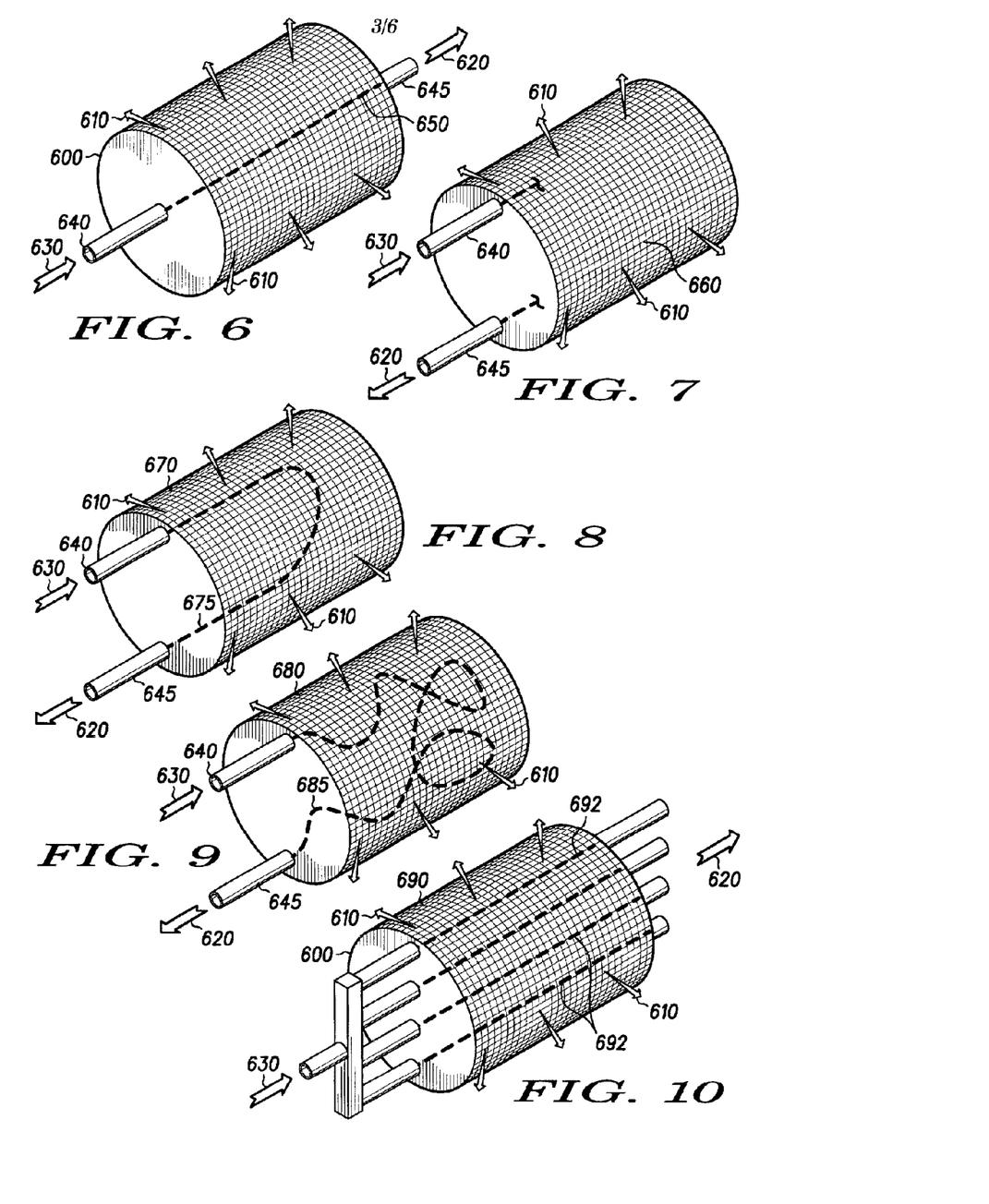
FIG. 6 illustrates a perspective view of an integral component device for at least partially partitioning a gas in accordance with another exemplary embodiment of the present invention.
FIG. 7 illustrates a perspective view of another integral component device for at least partially partitioning a gas in accordance with another exemplary embodiment of the present invention.
FIG. 8 illustrates a perspective view of another integral component device for at least partially partitioning a gas in accordance with another exemplary embodiment of the present invention.
FIG. 9 illustrates a perspective view of another integral component device for at least partially partitioning a gas in accordance with another exemplary embodiment of the present invention.
FIG. 10 illustrates a perspective view of yet another integral component device for at least partially partitioning a gas in accordance with another exemplary embodiment of the present invention.

In one embodiment, fuel fluid 360 may be caused to flow through said flow field 330 passively, by operation of a pump and/or by any other means now known or hereafter derived by those skilled in the art. Various other means may be optionally, alternatively, sequentially and/or conjunctively employed to provide substantial or otherwise effective contact between said fuel fluid 360 and said first surface of said barrier 320 including, but not limited to: a convoluted flow channel path 335 (as generally depicted, for example, in FIG. 3); a substantially planar channel area 435 (as generally illustrated, for example, in FIG. 4) for increased exposure of fuel fluid 460 flowing in from flow field inlet 440 to provide inter alia a greater surface area of contact with, for example, a mating porous barrier (not depicted) prior to effluent 450 exiting flow field outlet 445; and/or corrugations 520 (as representatively illustrated, for example, in FIG. 5). Additionally, said barrier 320 may be configured with substantially matching corrugations to provide optimal contact with: a corrugated flow field 500; a substantially laminar flow field; a linear flow field; a non-linear flow field; a curvilinear flow field and such other means now known or hereafter derived by those skilled in the art.

Said barrier 320 may further comprise a membrane, a porous ceramic, a porous silicon matrix, a stainless steel grit, fritted glass and/or the like or such other materials now known or hereafter derived by those skilled in the art. In the case of barrier 320 optionally comprising a membrane, said membrane may be polymeric and may be adapted to exhibit hydrophobic or hydrophilic properties. In one exemplary embodiment, in accordance with a representative aspect of the present invention, said membrane may comprise Teflon® (E.I. du Pont de Nemours and Co., Wilmington, Del.), Zitex® (Saint Gobain Performance Polymers, Inc., Amherst, N.Y.), Zitex® G (Saint Gobain Performance Polymers, Inc., Amherst, N.Y.) or such other suitably configured and/or adaptable gas-permeable materials now known or hereafter derived by those skilled in the art.

In various exemplary applications of the present invention, gas-permeable barrier 320 may be selected to demonstrate at least partial permeability to $CO_2$, $CH_3OH$, CHOOH, $H_2CO$, $H_2$, $O_2$, $H_2O$, $H_2O_2$ and/or such other chemical species as may now be known or hereafter utilized by those skilled in the fuel cell art.

In another representative embodiment of an exemplary component system in accordance with the present invention, an open mesh or screen cap 310 may optionally be used to secure said barrier 320 to said flow field 330 so as to generally seal said component system from substantial leakage or fluid migration of fuel fluid 360 and/or effluent liquid 350 such that said component system may be operated substantially independent of orientation with respect to gravity. Alternatively or conjunctively, a sealed cathode cap may also be used, for example, in forced-air systems. Gaseous byproduct 370 may generally pass through openings 315 of said screen cap 310, for example, to exhaust to the ambient atmosphere. Screen cap 310 may also optionally comprise a peripheral skirt 318 to aid attachment and sealing of said barrier 320 to said flow field 330. Various other means for sealing said barrier 320 to said flow field 330 may alternatively or additionally comprise: a gasket; a clamp; a press-fit clip; a heat-melted seal; a vacuum seal; a magnetic seal; a screw; a bolt; a nut; a rivet; a pin; an adhesive; solder; an aligning element and/or the like or such other sealing means now known or hereafter derived by those skilled in the art. Additionally, barrier 320 may be configured to be substantially self-gasketing.

Various other exemplary systems for partitioning gaseous byproducts from fuel cell fluid streams may also include representative configurations as depicted, for example, in FIGS. 6–10. Incident fluid 630 may be caused to flow through fluid flow inlet line 640 where fluid 630 comes into effective contact with the interior surface 650 of, for example, a three-dimensional, gas-permeable barrier 600, as depicted, for example in FIG. 6. Gas 610 diffuses through said barrier 600 to exit from the exterior surface of said barrier 600. Effluent fluid 620 containing at least a lesser concentration of said gas 610 than incident fluid 630 then exits said barrier 600 to flow through fluid flow outlet line 645.

Various modifications may be made to the transport paths in such exemplary three-dimensional, gas-permeable barrier devices in accordance with specific fuel cell designs, applications and/or operating environments. For example, a barrier 660 may be optionally configured to comprise at least one fluid flow inlet 640 and fluid flow outlet 645 from substantially the same face of said barrier 660, as generally depicted, for example, in FIG. 7. The transport path 675 may also be extended, for example, to increase the surface for exposure of incident fluid 630 to the interior of, for example, a loop-path barrier 670 (see FIG. 8). The transport path 685 may also be configured to comprise helical or convoluted paths within a permeable barrier 680 (see FIG. 9). In still other exemplary embodiments, a permeable barrier 690 may be alternatively, sequentially and/or conjunctively configured to comprise at least a plurality of transport paths 692 (see FIG. 10). Those skilled in the art will appreciate that while FIGS. 6–10 depict certain representative three-dimensional barriers having substantially cylindrical geometries, various other geometries may be alternatively, sequentially and/or conjunctively used, such as, but not limited to, spherical, ovoid, toroidal, conic, polyhedroid, regular solids and/or irregular solids or such other geometries now known or hereafter derived by those skilled in the art. Those skilled in the art will further appreciate that various other fluid transport paths may also be readily derived or otherwise operationally modified from the disclosure of the present invention. The same shall be considered within the scope of this invention.

One representative method of manufacturing a device for controlling gas transport in a fuel cell in accordance with various embodiments of the present invention may include the utilization of conventional ceramic fabrication technology. Such a component system may, in one representative application, be substantially implemented to develop, for example, an integral DMFC device. In one representative operational mode, separation of $CO_2$ gas in such a DMFC may be accomplished by passing aqueous anode fuel solution through a flow field for exposure of the fuel stream to a gas-permeable membrane to allow for diffusion or penetration of gaseous $CO_2$ therethrough. In one exemplary application, rates of $CO_2$ gas transport through such a membrane may be controlled inter alia by the porosity or thickness of the membrane. In another exemplary application, evaporation of aqueous and/or azeotropic components in the anode fuel solution may be attenuated with certain hydrophobic polymeric membrane materials such as, for example, Zitex® A and Zitex® G and/or alternatively, sequentially or conjunctively by operating the system passively or at low pressure. In one exemplary embodiment, a pressure gradient may be established by incorporation of, for example, a flow-restrictive material at the fluid flow outlet and/or by reducing the channel size so as to cause relative flow constriction at or otherwise near said fluid flow outlet. Those skilled in the art will recognize that any flow-restrictive material may be used, such as, but not limited to, foam, textile fiber, paper fiber, polymeric tubing and the like. Moreover, suitably configured flow-restrictive materials, in addition to other materials now known or hereafter derived in the art, may be used for the gas phase nucleation of gaseous compounds out of solution.

Figure 11:
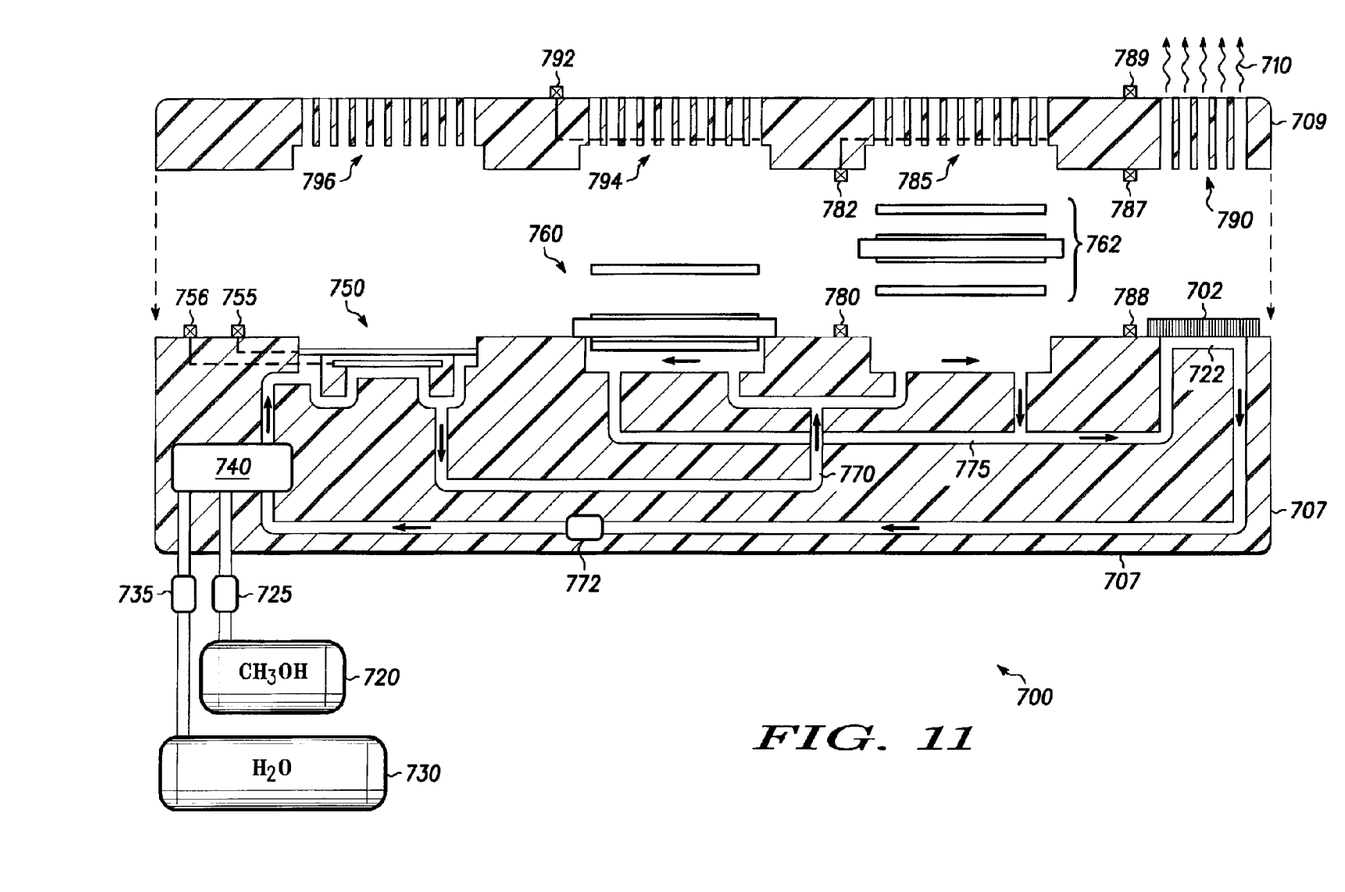
FIG. 11 illustrates a side elevation view of a substantially integrated DMFC system having a component sub-system for at least partially partitioning carbon dioxide in accordance with one exemplary embodiment of the present invention.

A representative component system in accordance with another exemplary embodiment of the present invention may be readily adapted for relatively simple integration with inter alia a multi-layer DMFC substrate system as depicted, for example, in FIG. 11. DMFC system 700 generally comprises a fuel stream housing 707 and a ventilation housing 709. Methanol 720 is fed to anode fuel mixing chamber 740 by operation of methanol fuel pump 725. Similarly, water 730 is fed to mixing chamber (740 by operation of water fuel pump 735. Methanol sensor 750 measures the concentration of methanol 720 in the anode fuel stream to provide control feedback to methanol pump 725 and water pump 735 to generally actuate relative concentration of the fuel components. Venting port 796 vents water vapor from, while providing air to, the methanol sensor 750.

Fuel stream housing 707 may be configured to include a supply fuel path 770 and an exhaust fuel path 775. Supply fuel path 770 provides anode fuel flow from fuel mixing chamber 740 to deliver a methanol 720 and water 730 fuel mixture to the anode of at least one MEA stack 760, 762. MEA fuel stacks 760 and 762 are configured with venting ports 794, 785 to permit water vapor to escape from the MEA cathode, for example, to the ambient environment and to provide access for air to reach the cathode. Circuit connection points 755, 756, 780, 782, 787, 788, 789 and 792 provide various sites of electrical contact for drawing off electrical power and/or to monitor or control DMFC operation.

Anode fuel drawn away from MEA's 760 and 762 flows through exhaust fuel path 775 to fluid flow field 722 where byproduct $CO_2$ 710 may escape through a gas-permeable barrier 702 and subsequently through exhaust vents 790 to the ambient environment. Recycled anode fuel flows from fluid flow field 722 by operation of pump 772 to return to mixing chamber 740.

Figure 12:
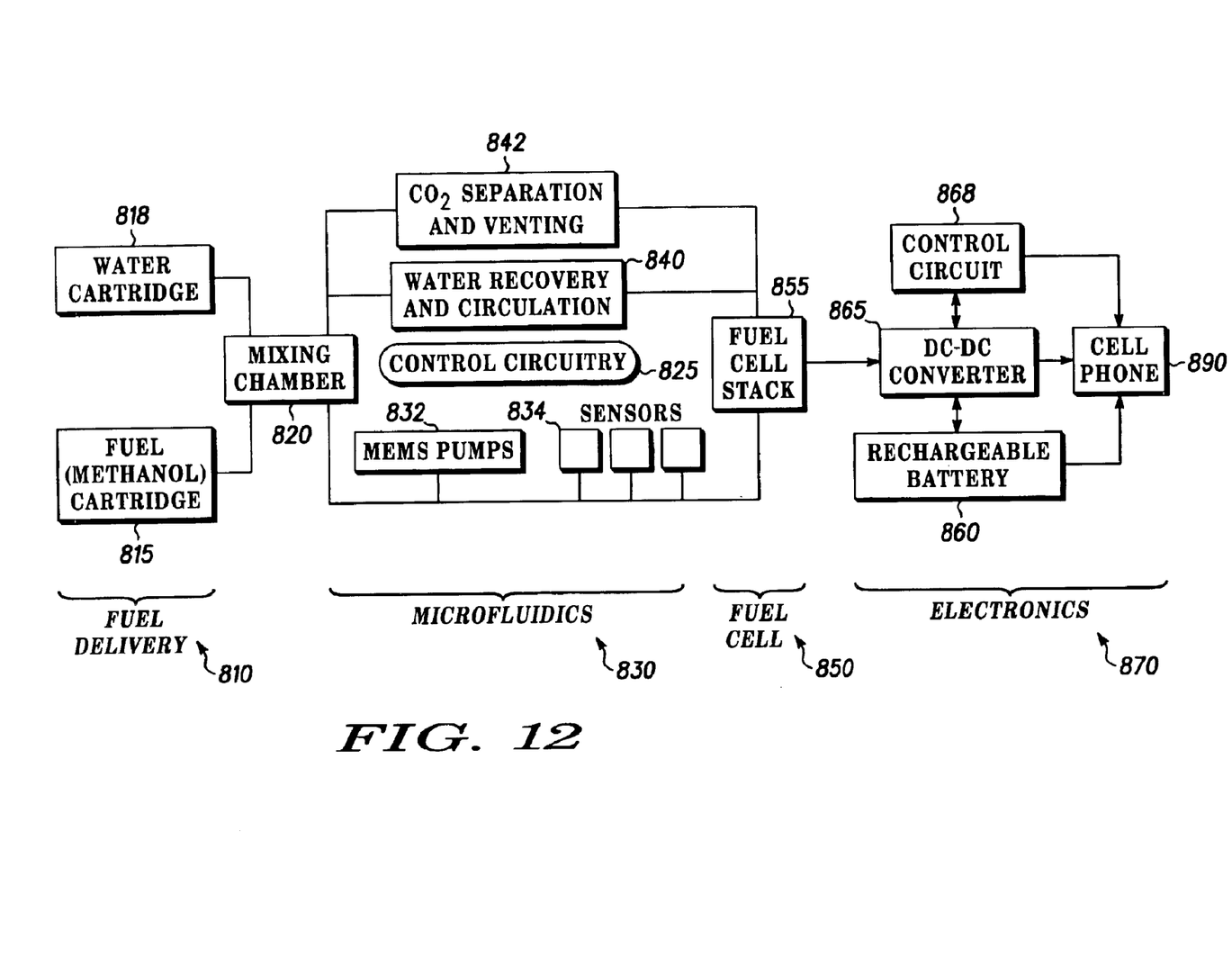
FIG. 12 illustrates an operational flowchart corresponding to the representative embodiment depicted, for example, in FIG. 11.

FIG. 12 depicts a process control flowchart for the operation of an exemplary DMFC system in accordance with one representative aspect of the present invention. Exemplary control components are grouped under the general headings 'Fuel Delivery' 810, 'Microfluidics' 830, 'Fuel Cell' 850 and 'Electronics' 870. The fuel delivery component comprises, for example, cartridge means for supplying water 818 and methanol 815 to mixing chamber 820, which operates to bridge said fuel delivery control components 810 with microfluidic components 830. Microfluidic components 830 comprise control subsystems 825 for fluidic supply of fuel from mixing chamber 820 to: (1) pump fuel fluid 832 with feedback sensor actuation support 834; (2) affect water recovery and re-circulation 840; and (3) affect $CO_2$ separation and venting 842. The feedback sensor actuation support 834 could comprise any type of sensor, for example, a methanol sensor, a concentration sensor, and a temperature sensor. The fuel cell 855 operates to bridge the fuel delivery 810 and microfluidic 830 systems with the electronic device 870 to be powered. Electronic device 870 may also optionally include any or all of the following: control circuitry 868; a DC—DC converter 865; a rechargable battery 860 and/or the like or such other electronic components now known or hereafter derived by those skilled in the art. In one representative and exemplary embodiment of the present invention, such an electronic device 870 may comprise, for example, a mobile phone 890.

Application of gas transport technology in accordance with various exemplary embodiments of the present invention may be used in any fuel cell and/or any fuel cell powered device or system, such as, for example: mobile phones; laptop computers; portable entertainment devices; and/or the like or any device capable of being configured or otherwise adapted to fuel cell power now known or hereafter derived in the art.

Figure 13:
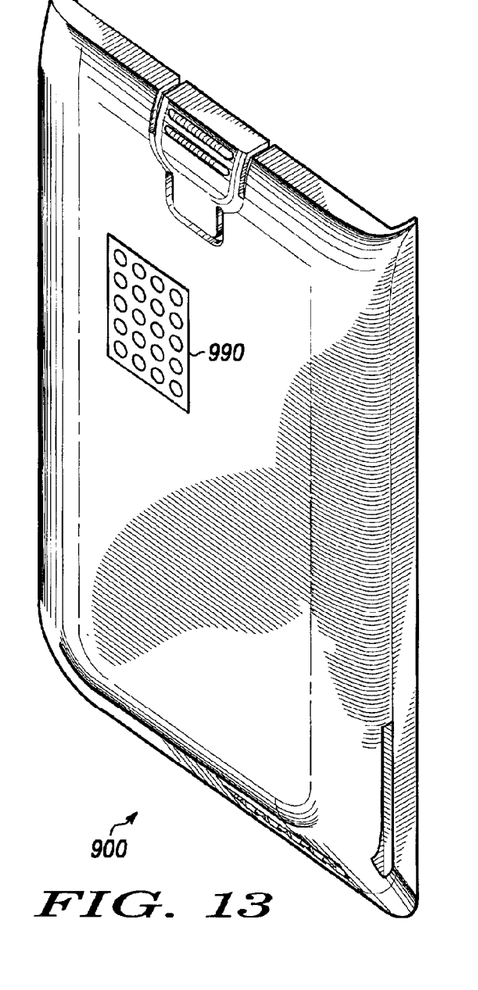
FIG. 13 illustrates a perspective view of a representative fuel cell for use with a mobile phone in accordance with one exemplary embodiment of the present invention.
Figure 14:
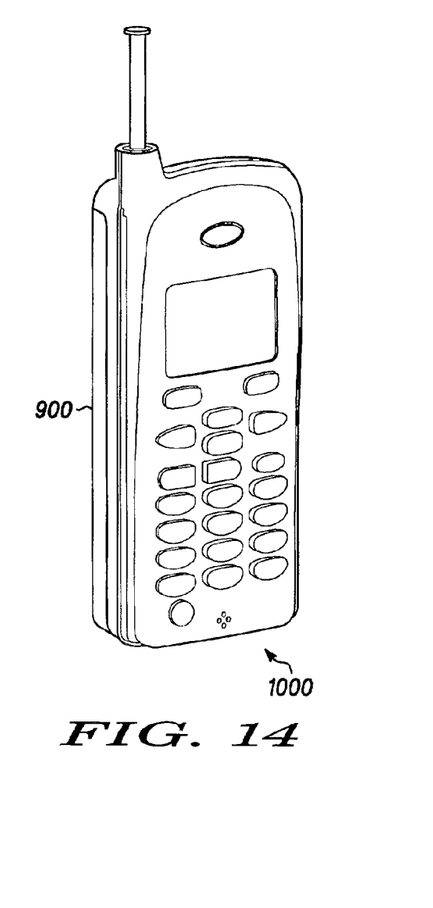
FIG. 14 illustrates a perspective view of a mobile telephone for exemplary interoperability with, for example, the representative embodiment depicted in FIG. 13.

For example, as generally illustrated in FIGS. 13 and 14, a mobile phone 1000 may be configured with a DMFC fuel cell 900 having an exhaust port 990 comprising a covering for a $CO_2$ permeable membrane in accordance with one embodiment of the present invention so as to permit mobile phone 1000 to be substantially operated in any orientation with respect to gravity. Accordingly, such a device 1000 would be suitably adapted to vent $CO_2$ without substantial leakage or migration of, for example, liquid fuel components onto the user or otherwise external to said mobile phone device 1000.

A prototype DMFC device, in accordance with one exemplary embodiment of the present invention, operating at ambient temperature (e.g., 28° C.) and ambient pressure (e.g., 760 torr) was observed to eliminate 0.172 grams of carbon dioxide from the anode fuel stream over one hour. The rate of $CO_2$ elimination was substantially independent of orientation with respect to gravity and gave corresponding losses of only 7E–6 grams of methanol and 2.7E–3 grams of water over the same duration of time. Skilled artisans, however, will appreciate that substantially improved performance may be had with experimental optimization of various features and aspects of the present invention; the same shall be considered within the scope of the present invention.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above. For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components of any or all the claims.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing specifications, design parameters or other operating requirements without departing from the general principles of the same.

What is claimed is:

1. A system for controlling the concentration of at least one gaseous redox byproduct in at least one of an anode fuel solution and a cathode oxidant solution of a fuel cell, the system comprising:

a fluid flow field having an inlet and an outlet defining a length wherein said at least one of an anode fuel solution and a cathode oxidant slows from said inlet to said outlet;

at least one barrier that is at least partially permeable to at least one of said gaseous byproducts;

said barrier comprising at least a first surface and a second surface;

said first surface of said barrier positioned adjacent and substantially along the length of said fluid flow field and having an effective amount of contact with said at least one of an anode fuel solution and a cathode oxidant solution; and said barrier disposed to at least effectively seal said system from migration of said at least one of an anode fuel solution and a cathode oxidant solution and said gaseous redox byproduct beyond said second surface of said barrier other than via substantially permeative transport through said barrier as at least one of an anode fuel solution and a cathode oxidant flows from said inlet to said outlet.

2. The system according to claim 1, wherein said first surface is an interior surface and said second surface is an exterior surface.

3. The system according to claim 1, wherein said barrier comprises a substantially planar geometry.

4. The system according to claim 1, wherein said barrier has a geometry comprising at least one of a sphere, a spheroid, an ovoid, a toroid, a cylinder, a cone, a conic section, a regular solid, an irregular solid, a polyhedron, a polyhedroid and a corrugated surface.

5. The system according to claim 1, wherein said fluid flow field comprises at least one of a laminar flow field, a linear flow field, a non-linear flow field, a curvilinear flow field and a convoluted flow field.

6. The system according to claim 1, wherein said gaseous redox byproduct comprises at least one of $CO_2$, $CH_3OH$, $CHOOH$, $H_2CO$, $H_2$, $O_2$, $H_2O$ and $H_2O_2$.

7. The system according to claim 1, wherein said barrier comprises at least one of a polymer membrane, a porous ceramic, a porous silicon matrix, a stainless steel grit and fitted glass.

8. The system according to claim 1, wherein said barrier is substantially self-gasketing.

9. The system according to claim 1, wherein said system further comprises a substantially integral article of manufacture.

10. A device for controlling the concentration of at least one gaseous redox byproduct in a fuel cell solution comprising;

a barrier which is permeable to at least one gaseous compound, said barrier comprising at least an interior surface and an exterior surface, the barrier forming a fluid flow field having an inlet end an outlet wherein said at least one gaseous redox byproduct flows from said inlet to said outlet along said barrier;

said interior surface of said barrier comprising at least one fluid flow path for flowing said at least one gaseous redox byproduct contained therein; and said barrier disposed to at least effectively seal said device from migration of said gaseous redox byproduct beyond said exterior surface other than via substantially permeative transport through said barrier as said at least one gaseous redox byproduct flows through at least one fluid flow path.

11. A system for controlling the concentration of carbon dioxide in a methanol fuel cell fuel solution, comprising:

a fluid flow field having a length;

a barrier permeable to $CO_2$ positioned substantially along the length of the fluid flow field and having at least an interior and an exterior surface; and means for effectively sealing said interior surface of said barrier to said fluid flow field so as to prevent $CH_3OH$ and $CO_2$ migration beyond said exterior surface of said barrier other than via substantially permeative transport through said barrier as said carbon dioxide flows through said fluid flow field.

12. The system according to claim 11, wherein said fluid flow field further comprises a convoluted fluid flow path.

13. The system according to claim 11, wherein said barrier comprises a hydrophobic membrane.

14. The system according to claim 11, wherein said sealing means comprises at least one of a peripherally secured screen cap and a sealed cathode cap.

15. The system according to claim 11, wherein said sealing means comprises an open mesh.

16. The system according to claim 11, wherein said system comprises a DMFC.

17. A system for controlling exhaust transport of water vapor in a fuel cell solution, comprising:

a fluid flow field having a length;

a barrier permeable to water vapor, the barrier positioned substantially along the length of said fluid flow field and having at least an interior and an exterior surface; and means for at least effectively sealing said membrane so as to prevent bulk solution leakage.

18. The system according to claim 17, wherein said barrier comprises a hydrophilic membrane.

19. The system according to claim 17, wherein said system comprises a DMFC.

* * * * *